United States Patent [19]
Mineo

[11] Patent Number: 5,928,044
[45] Date of Patent: Jul. 27, 1999

[54] EXHAUST SYSTEM FOR AN ENGINE

[75] Inventor: Shigeharu Mineo, Iwata, Japan

[73] Assignee: Yamaha Hatsudoki Kabushiki Kaisha, Iwata, Japan

[21] Appl. No.: 08/943,059

[22] Filed: Oct. 2, 1997

[30] Foreign Application Priority Data

Oct. 2, 1996 [JP] Japan .................................. 8-281824

[51] Int. Cl.$^6$ ................................................ B63H 21/32
[52] U.S. Cl. ............................................................. 440/89
[58] Field of Search .................................. 440/38, 88, 89, 440/900; 114/270

[56] References Cited

U.S. PATENT DOCUMENTS

| | | |
|---|---|---|
| 4,824,409 | 4/1989 | Kobayashi . |
| 5,234,364 | 8/1993 | Ito ............................................. 440/89 |
| 5,524,597 | 6/1996 | Hiki et al. . |
| 5,531,620 | 7/1996 | Ozawa et al. ............................ 440/89 |
| 5,536,189 | 7/1996 | Mineo . |
| 5,556,314 | 9/1996 | Fukuda et al. . |
| 5,636,586 | 6/1997 | Suganuma . |
| 5,676,575 | 10/1997 | Fukuda et al. . |

*Primary Examiner*—Stephen Avila
*Attorney, Agent, or Firm*—Knobbe, Martens, Olson & Bear LLP

[57] ABSTRACT

An exhaust system is provided for an engine of the type used to power a watercraft. The engine has at least one combustion chamber with an exhaust passage leading therefrom. A crankshaft of the engine rotates about an axis passing through the engine. The exhaust system includes an exhaust manifold connected to the engine and having a passage leading therethrough from the exhaust passage leading from the combustion chamber. The exhaust manifold is connected to an exhaust pipe leading to an exhaust discharge. The connection of the exhaust manifold and exhaust pipe is generally aligned with the crankshaft axis, but positioned vertically thereabove.

17 Claims, 8 Drawing Sheets

EXHAUST SYSTEM FOR AN ENGINE

FIELD OF THE INVENTION

The present invention relates to an exhaust system. More particularly, the invention is an exhaust system for an internal combustion engine of the type used to power a watercraft.

BACKGROUND OF THE INVENTION

Internal combustion engines are often used to power watercraft, including those watercraft known as personal watercraft. These watercraft include a hull which defines an engine compartment. The engine is mounted within the engine compartment and arranged to drive a water propulsion device.

Exhaust which is generated by the engine is routed through an exhaust system to a point external to the watercraft. Generally, this is accomplished by routing the exhaust into the water in which the watercraft is operating. When the water propulsion device is a water jet propulsion device, the exhaust may be routed into the water which is being expelled from the jet propulsion device to propel the craft.

These exhaust systems generally include a first portion which is connected directly to the engine. Exhaust flows from each combustion chamber of the engine through an exhaust passage into this first portion. A second portion of the exhaust system is connected to the first portion and leads to the exhaust discharge.

The first and second portions of the exhaust system are generally connected with a flexible coupling member. This coupling permits expansion of the exhaust system portions due to temperature changes and the like.

A problem exists that the durable life of the coupling member is shortened significantly due to the transmission of engine and watercraft vibration through the exhaust system portions. These vibrations may eventually cause the coupling to break, causing exhaust leaks in the exhaust system. In addition, in those instances where coolant flows through a coolant jacket corresponding to the exhaust system, the rupture of the coupling may cause a corresponding coolant jacket rupture.

An exhaust system for an engine of the type utilized to power a watercraft which overcomes the above-stated problems is desired.

SUMMARY OF THE INVENTION

In accordance with the present invention there is provided an exhaust system for an engine of the type used to power a water propulsion device of a watercraft.

Preferably, the watercraft is of the type having a hull, with the engine connected to the hull. The engine has an output shaft arranged in driving relation with the water propulsion device. The output shaft extends along an axis. The engine has at least one combustion chamber with an exhaust passage leading therefrom.

The exhaust system includes an exhaust manifold having a first end and a second end, the first end connected to the engine and having a passage therethrough leading from the exhaust passage. The exhaust system includes an exhaust pipe having a first end connected to the second end of said exhaust manifold at a connection positioned generally vertically above, and in alignment with, the axis. Preferably, the connection is positioned in front of a front end of the engine.

In a preferred embodiment, the exhaust manifold is branched and is connected to a first side of the engine. The exhaust pipe is connected to a second side of the engine opposite the first.

In accordance with the present invention, the location of the connection between the manifold and exhaust pipe in the vertical plane extending through the crankshaft reduces the transmission of forces to the exhaust system, thus extending the life of the exhaust system.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

The present invention is an exhaust system for an engine. Preferably, the engine is of the type utilized to power a watercraft, and more particularly, a personal watercraft, as this is an application for which the exhaust system has particular advantages. It should be understood, however, that the exhaust system may be used in other applications.

Figure 1:
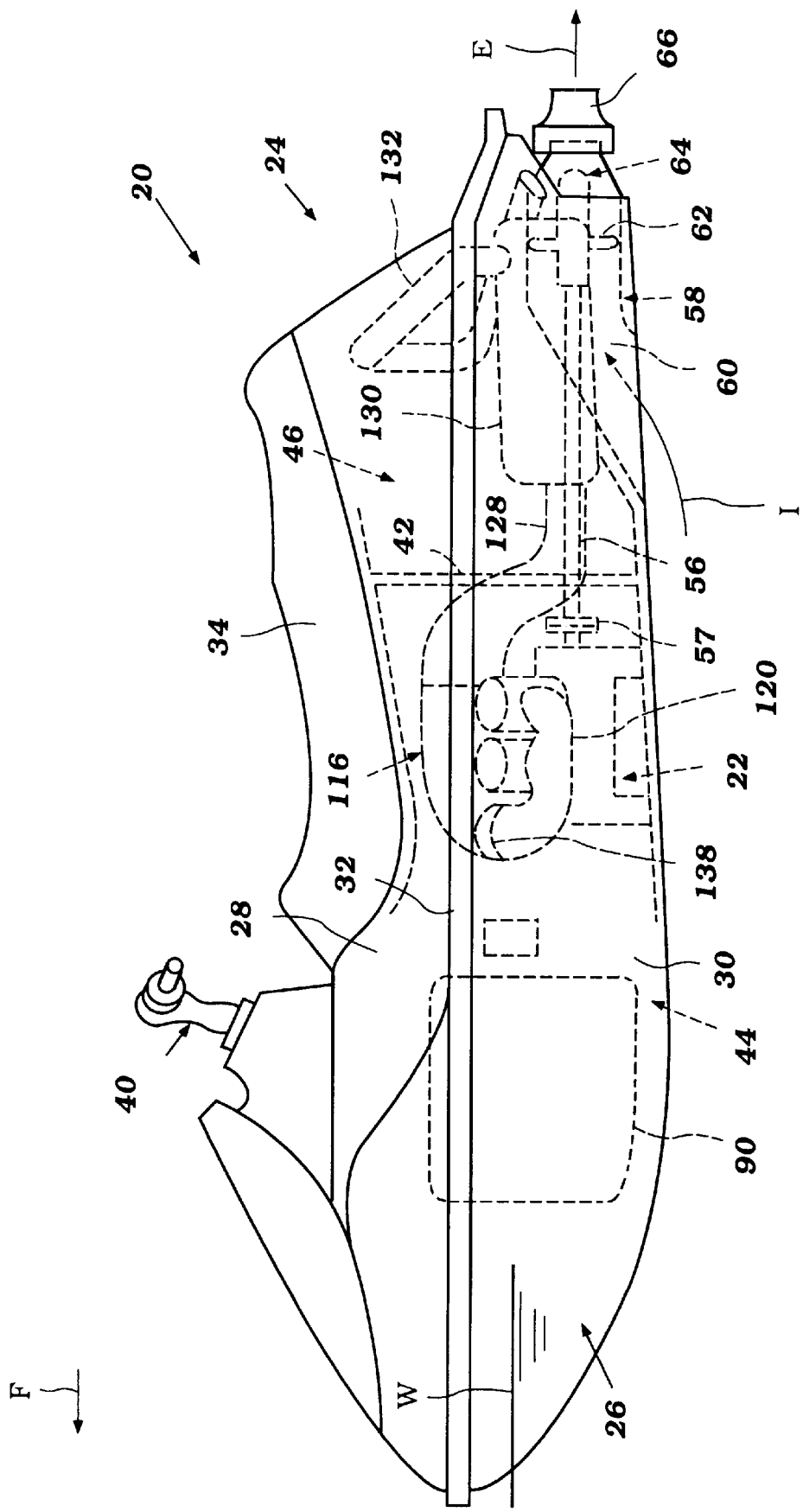
FIG. 1 is a side view of a personal watercraft of the type powered by an engine having an exhaust system in accordance with the present invention, the engine and other watercraft components positioned within a hull of the watercraft illustrated in phantom.
Figure 2:
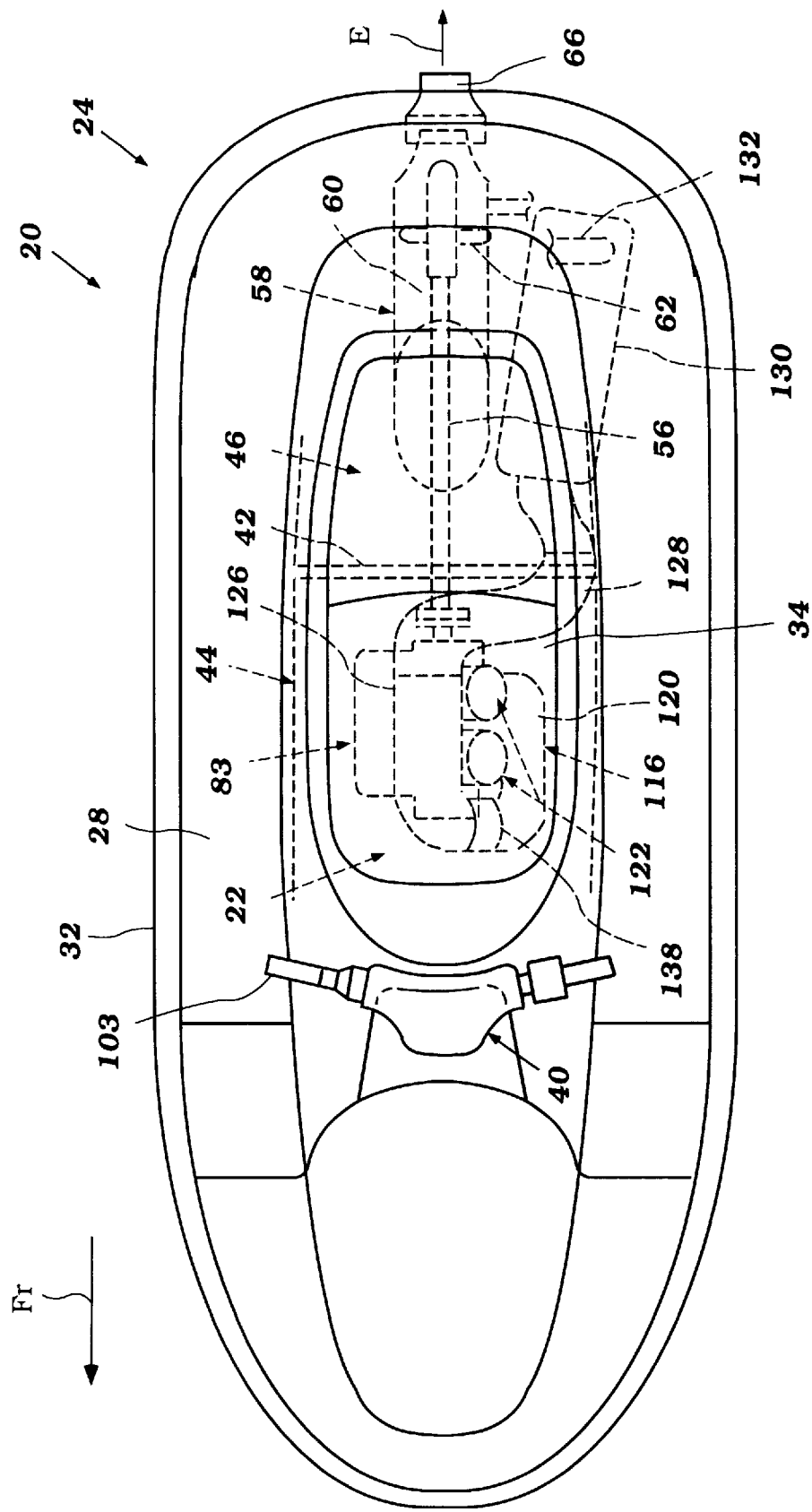
FIG. 2 is a top view of the watercraft illustrated in FIG. 1, with the engine and other watercraft components positioned within the hull of the watercraft illustrated in phantom.

FIGS. 1 and 2 illustrate a watercraft 20 having a watercraft body 24 comprising a hull 26 having a top portion or deck 28 and a lower portion 30. A gunnel 32 defines the intersection of the hull 26 and the deck 28.

A seat 34 is positioned on the top portion 28 of the hull 26. The seat 34 may be connected to a removable deck member for use in accessing an engine compartment within the hull 26, as described in more detail below. A steering handle 40 is provided adjacent the seat 32 for use by a user in directing the watercraft 20.

Figure 3:
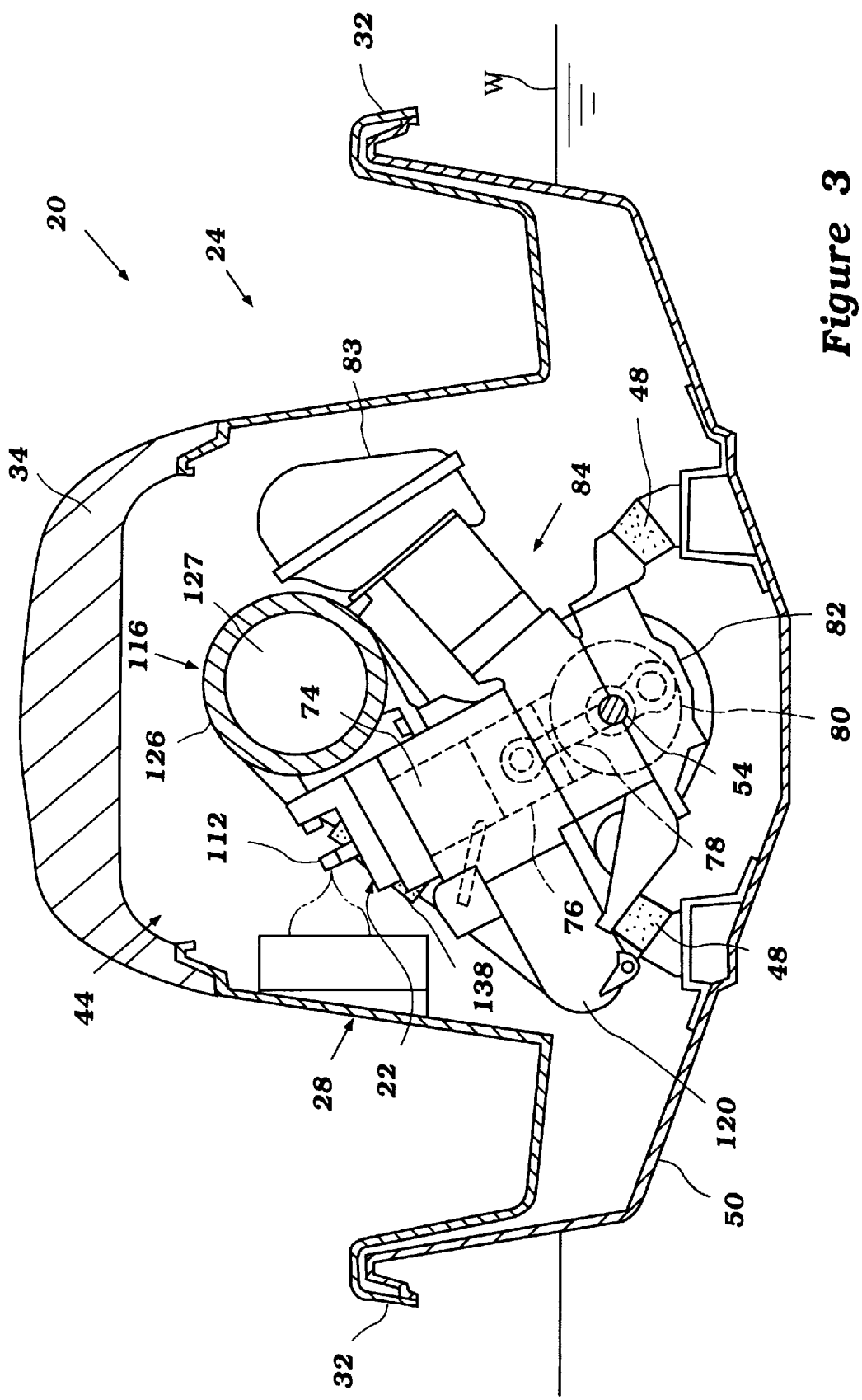
FIG. 3 is an end view, in partial cross-section, of the watercraft illustrated in FIG. 1.

The top and bottom portions 28,30 of the hull 26, along with a bulkhead 42, define an engine compartment 44 and a pumping chamber 46. An engine 22 is positioned in the engine compartment 44. As best illustrated in FIG. 3, the engine 22 is connected to the hull 26 via several engine mounts 48 connected to a bottom 50 of the lower portion 30 of the hull 26. The mounts 48 connect an engine support plate 52 to the hull 26. Preferably, the engine mounts 48 include at least one section comprising a material for damping vibration transmission between the hull 26 and engine 22. The engine 22 is preferably partially accessible through a maintenance opening accessible by removing the removable deck member on which the seat 34 is mounted.

The engine 22 has a crankshaft 54 (see FIG. 3) which is in driving relation with an impeller shaft 56. The crankshaft 54 preferably extends along an axis "C" (see FIGS. 5 and 6). The impeller shaft 56 rotationally drives a means for propelling water of a propulsion unit 58, which unit extends out a stem portion of the watercraft 20 (i.e. that end of the watercraft 20 opposite the front end facing in the direction Fr in FIG. 1). Referring to FIG. 1, an end of the crankshaft 54 extends through the crankcase cover to a coupling 57 where it is coupled to an end of the impeller shaft 56.

The propulsion unit 58 includes a propulsion passage 60 having an intake port which extends through the lower portion 30 of the hull 26 through which water is drawn in the direction I. The means for propelling water, preferably an impeller 62 driven by the impeller shaft 56, is positioned in the passage 60. The passage 60 also has an outlet 64 positioned within a nozzle 66. The nozzle 66 is mounted for movement up and down and to the left and right, for expelling water E under force, whereby the direction of the propulsion force for the watercraft 20 may be varied.

Figure 4:
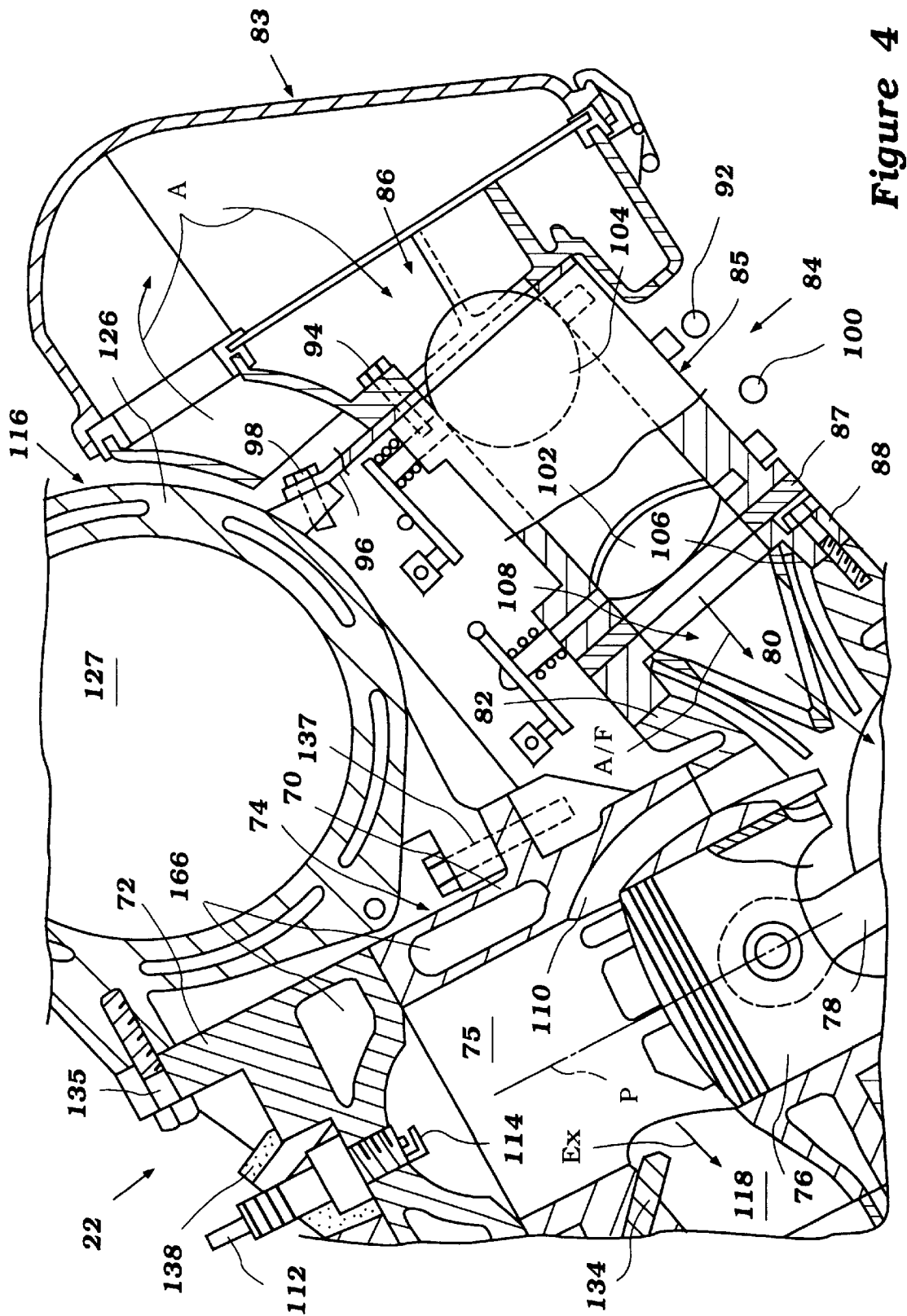
FIG. 4 is a cross-sectional end view of a portion of the engine illustrated in FIG. 1.
Figure 5:
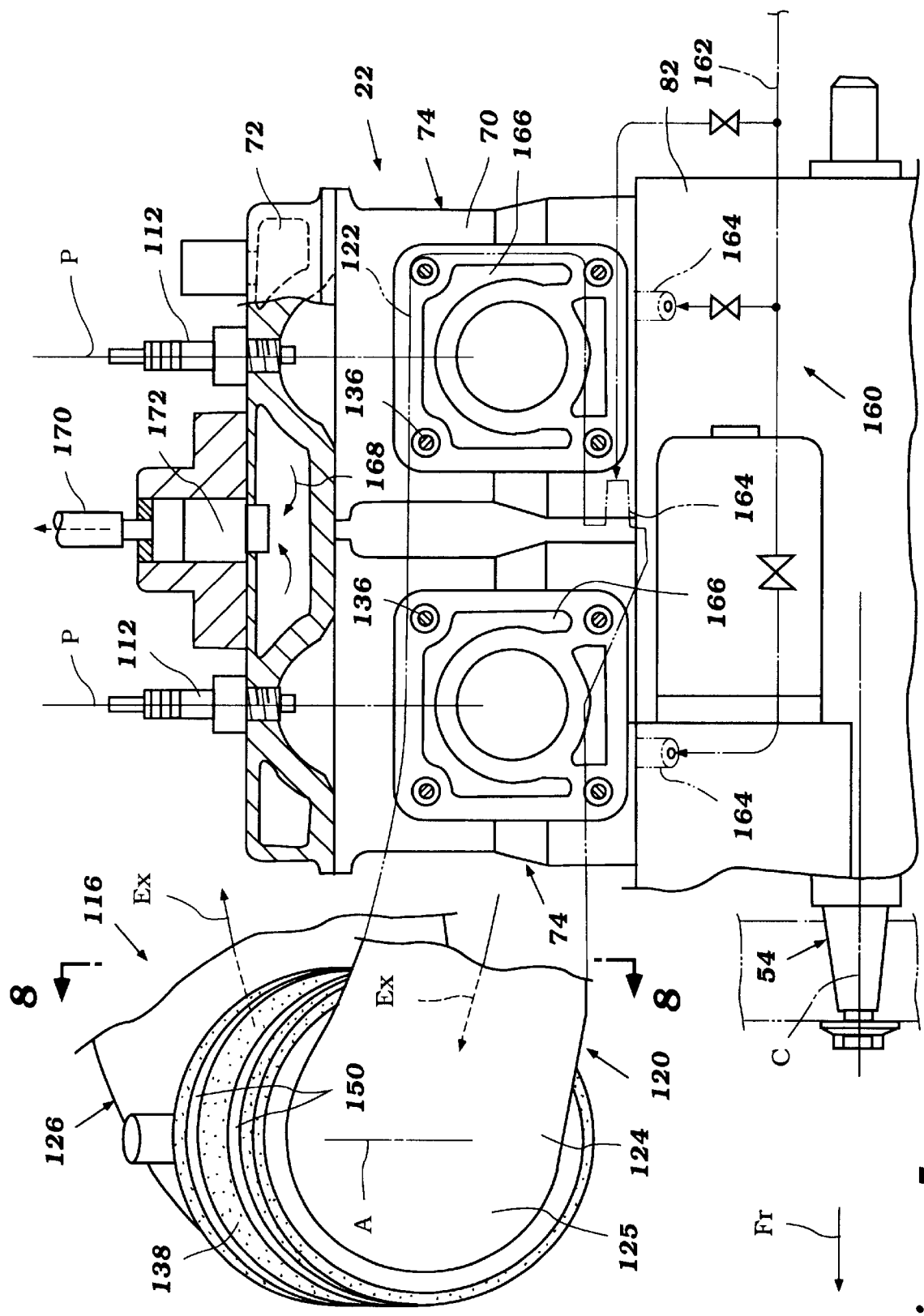
FIG. 5 is a side view, in partial cross-section, of the engine illustrated in FIG. 1.
Figure 6:
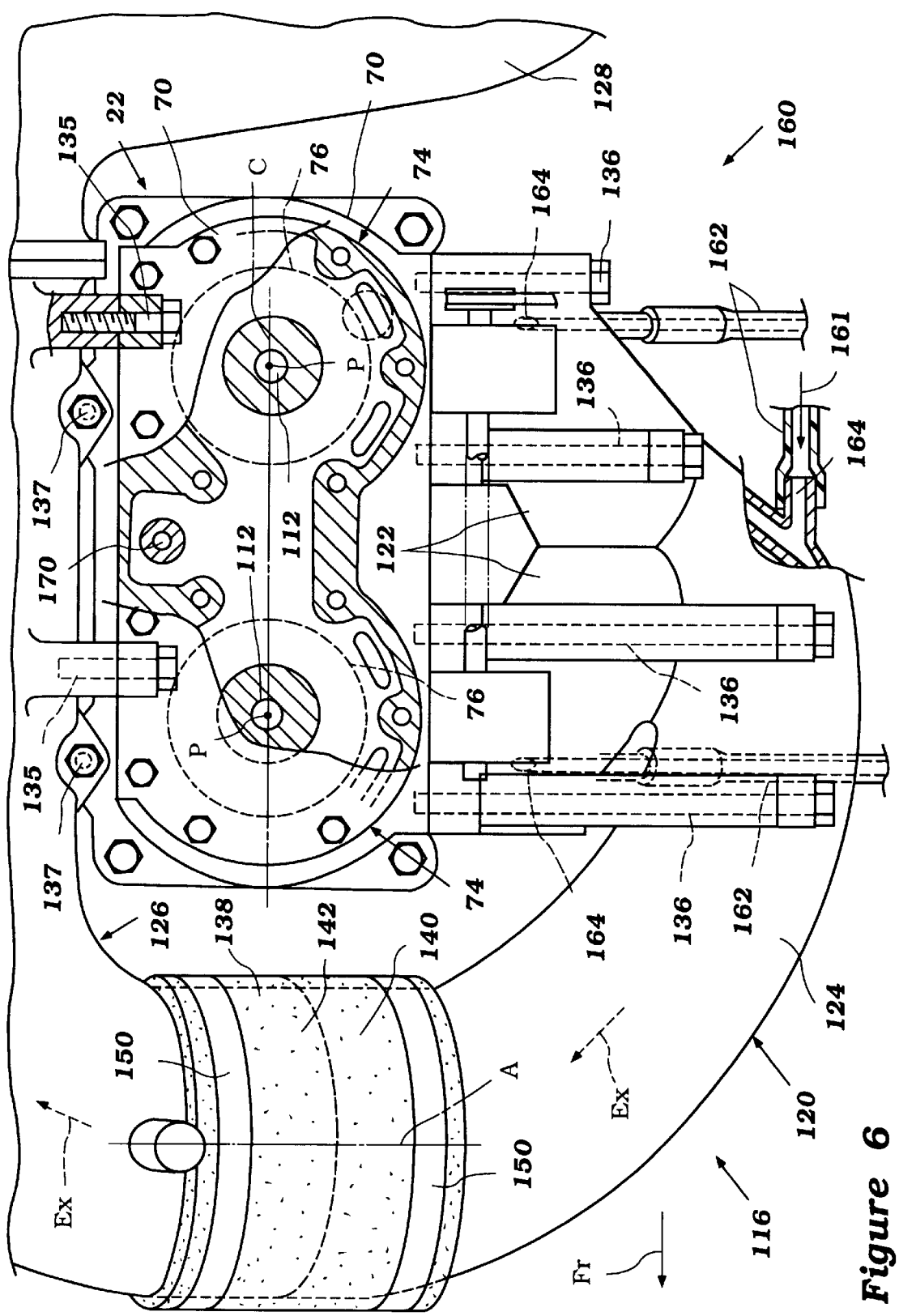
FIG. 6 is a top view, in partial cross-section, of the engine illustrated in FIG. 5.

The engine 22 is illustrated generally in FIGS. 1–3, with selected portions thereof illustrated in more detail in FIGS. 4–6. As illustrated therein, the engine 22 is preferably of the two-cylinder, two-cycle variety. Of course, the engine 22 may have as few as one, or more than two, cylinders, as may be appreciated by one skilled in the art. In addition, the engine may operate on a four-cycle or other operating principle.

Referring primarily to FIG. 5, the engine 22 includes a cylinder block 70 having a cylinder head 72 connected thereto and cooperating therewith to define two cylinders 74. Each cylinder 74 is defined by a cylinder wall within the block 70 and a recessed area in the cylinder head 72, with a portion thereof above a head of a piston 76 serving as a combustion chamber 75. The piston 76 is movably mounted in each cylinder along an axis P which extends through the cylinder 74 and generally radially outward from the axis C of the crankshaft 54. Each piston 76 is connected to the crankshaft 54 via a connecting rod 78, as is well known in the art. As illustrated, the cylinders 74 are preferably arranged so that their axes P are aligned in the same direction as the axis C.

The crankshaft 54 is rotatably journalled by a number of sealed bearings with respect to the cylinder block 70 within a crankcase chamber 80. Preferably, the chamber 80 is defined by a crankcase cover member 82 which extends from a bottom portion of the cylinder block 70. As is well known, the crankshaft 54 has pin portions extending between web portions thereof, with each connecting rod 78 connected to one of the pin portions and the web portions rotatably supported by the bearings mounted to members extending from the block 70 and cover 82.

As best illustrated in FIGS. 3 and 4, the engine 22 includes means for providing an air and fuel mixture to each combustion chamber 75. Preferably, air is drawn into the engine compartment 44 through one or more air inlets in the hull 26. Air is then drawn through an intake system 84 including an intake or air box 83 and delivered through an intake passage 86 leading through a throttle body 85 and an intake manifold 88 to the engine 22.

As illustrated, the air box 83 is preferably connected to a first end of the throttle body 85 with one or more fasteners 94. A mounting plate 96 extending between the throttle body 85 and air box 83 is connected to the cylinder block 70 with one or fasteners 98, providing secure mounting of the air box 83 and throttle body 85.

The end of the throttle body 85 opposite the air box 83 is mounted to the intake manifold 88 via a coupling plate 87. One or more fasteners then join the intake manifold 88 to the crankcase cover 82 portion of the engine 22.

Fuel is provided to each cylinder 74 for combustion. Preferably, fuel is combined with the incoming air. In particular, fuel is drawn from a fuel tank 90 (see FIG. 1) positioned in the engine compartment 44 by a fuel pump (not shown) and delivered through a fuel delivery line 92 to a charge former, which in this case comprises a carburetor unit associated with the throttle body 85.

Referring to FIG. 4, a throttle valve 102 and a choke valve 104 are preferably provided for allowing the watercraft operator to control the rate of fuel and air delivery to the engine 22 for controlling the speed and power output of the engine via a throttle linkage and choke linkage of the carburetor. Preferably, the throttle valve 102 is moveable from a throttle control 103 positioned on the steering handle 40 of the watercraft 20.

Fuel which is delivered to the carburetor 94 but not delivered to the air flowing therethrough may be returned to the fuel tank 90 through a return line 100. It is contemplated that the fuel may be provided to the engine by indirect or direct fuel injection, as well as via carburation, as known in the art.

The air and fuel mixture (labeled A/F in FIG. 4) selectively passes through an intake port 106 into the crankcase chamber 80 as controlled by a reed valve 108, as is known in the art. As is also well known, an intake port and corresponding reed valve 108 are preferably provided corresponding to each cylinder 74. The crankcase chamber 80 is compartmentalized so as to provide a crankcase compression feature for each combustion chamber as is well known in the operation of two-cycle engines.

The fuel and air charge within the crankcase chamber 80 is delivered to its respective combustion chambers 75 through at least one scavenge passage 110 leading to one or more scavenge ports in the cylinder wall.

A suitable ignition system is provided for igniting the air and fuel mixture provided to each combustion chamber. Preferably, this system comprises a spark plug 112 having its electrode tip 114 positioned in the combustion chamber 75. Each spark plug 112 is preferably fired by a suitable ignition system.

Though not illustrated, the engine 22 may include a flywheel connected to one end of the crankshaft 54 and having a number of magnets thereon for use in a pulser-coil arrangement for generating firing signals for the ignition system. In addition, the ignition system may include a battery for use in providing power to an electric starter and other electrical engine features. In addition, a number of teeth may be mounted on the periphery of the flywheel for use in starting the engine 22 with a starter motor (not illustrated).

The engine 22 includes a lubricating system for providing lubricating oil to the various moving parts thereof Preferably, the lubricating system includes an oil tank or reservoir (not shown) from which lubricating oil is delivered to and circulated throughout the engine, as is well known to those skilled in the art.

Referring to FIGS. 1, 2 and 4, exhaust gas (labeled "Ex" in the figures) generated by the engine 22 is routed from the engine to a point external to the watercraft 20 by an exhaust system 116 which includes an exhaust passage 118 leading from each combustion chamber 74 through the cylinder block 70. A manifold part 120 of the exhaust system 116 is connected to a side of the engine 22. The manifold 120 has two branch portions 122 each having a passage therethrough, each passage through a branch portion 122 aligned with one of the passages 118 leading through the cylinder block 70. Exhaust generated in each combustion chamber 75 is routed through a respective passage 118 into a branch 122 of the manifold 120.

Figure 7:
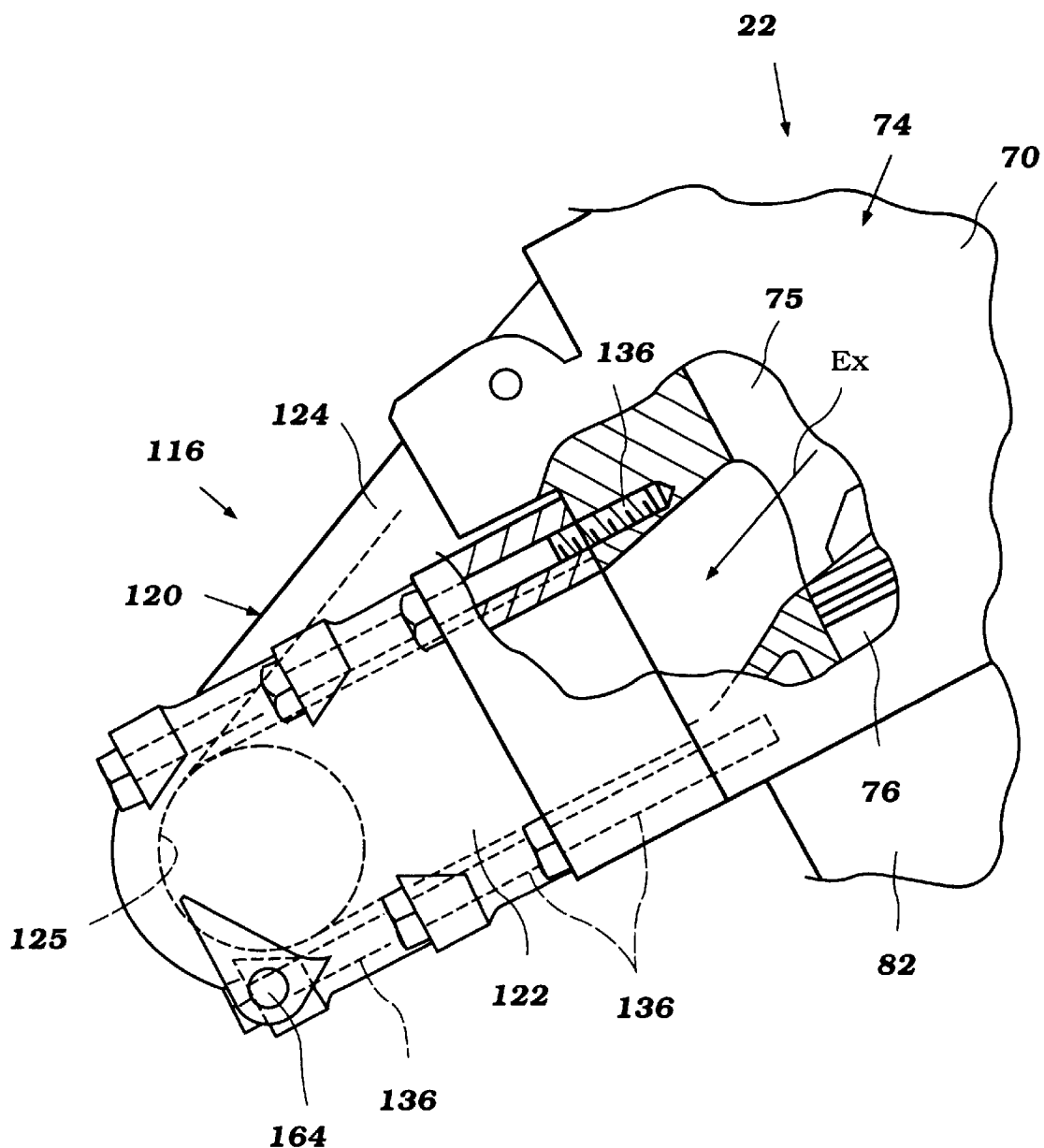
FIG. 7 illustrates, in partial cross-section, a portion of the exhaust system of the engine illustrated in FIG. 1.

The passages through each branch 122 of the manifold 120 merge into a single pipe part 124 having a passage 125 therethrough (See FIGS. 5 and 7). The pipe part 124 of the manifold 120 leads to an expansion pipe 126 part of the exhaust system 116. This expansion pipe 126 has a passage 127 therethrough which preferably includes an enlarged part or chamber through which exhaust routed.

As illustrated in FIG. 6, exhaust flows from the expansion pipe 126 into an upper exhaust pipe 128. The upper exhaust pipe 128 preferably narrows to a smaller diameter from the enlarged expansion pipe 126. The upper exhaust pipe 128 routes exhaust to a water lock 130. The upper exhaust pipe 128 is preferably connected to the water lock 130 via a flexible fitting, such as a rubber sleeve. The exhaust flows through the water lock 130, which is preferably arranged as known to those skilled in the art, and then passes to a lower exhaust pipe 132 which has its terminus in the propulsion passage. In this manner, exhaust flows from the engine 22 through the exhaust system to its discharge within the water flowing through the passage 60. A catalyst (not shown) may be positioned within the exhaust system 116 for catalyzing the exhaust gases.

Means are preferably provided for controlling the flow of exhaust gases through the exhaust passages 118 from the combustion chambers 75. As illustrated, this means comprises a sliding-knife type valve 134, but may comprise a rotating or other type valve, and means for moving the valve, as well known to those skilled in the art.

Certain aspects of the exhaust system will now be described in more detail. As best illustrated in FIGS. 5 and 6, the manifold 120 preferably extends outwardly from a side of the engine 22 and then curves and extends in the forward or front direction Fr of the watercraft 20. The manifold 120 then curves about the front end of the engine 22 (i.e. that end facing the front end of the watercraft 20). Preferably, the manifold 120 is connected to the engine 22 by several fasteners. In the embodiment illustrated, these fasteners comprise bolts 136.

The expansion pipe 126 extends from its connection with the manifold 120 in front of the front end of the engine 22, before curving along the opposite side thereof opposite the manifold 120. The pipe 126 then extends rearwardly along the side of the engine 22 to its connection with the upper exhaust pipe 128 near the rear of the engine.

The expansion pipe 126 is preferably connected to the cylinder head 72 and block 70 with one or more fasteners, generally opposite the connection of the manifold 120 to the engine 22. Referring to FIGS. 4 and 6, a first pair of bolts 135 connect the expansion pipe 126 to the cylinder head 72. Similarly, a second pair of bolts 137 connects the expansion pipe 126 with the cylinder block 70.

Figure 8:
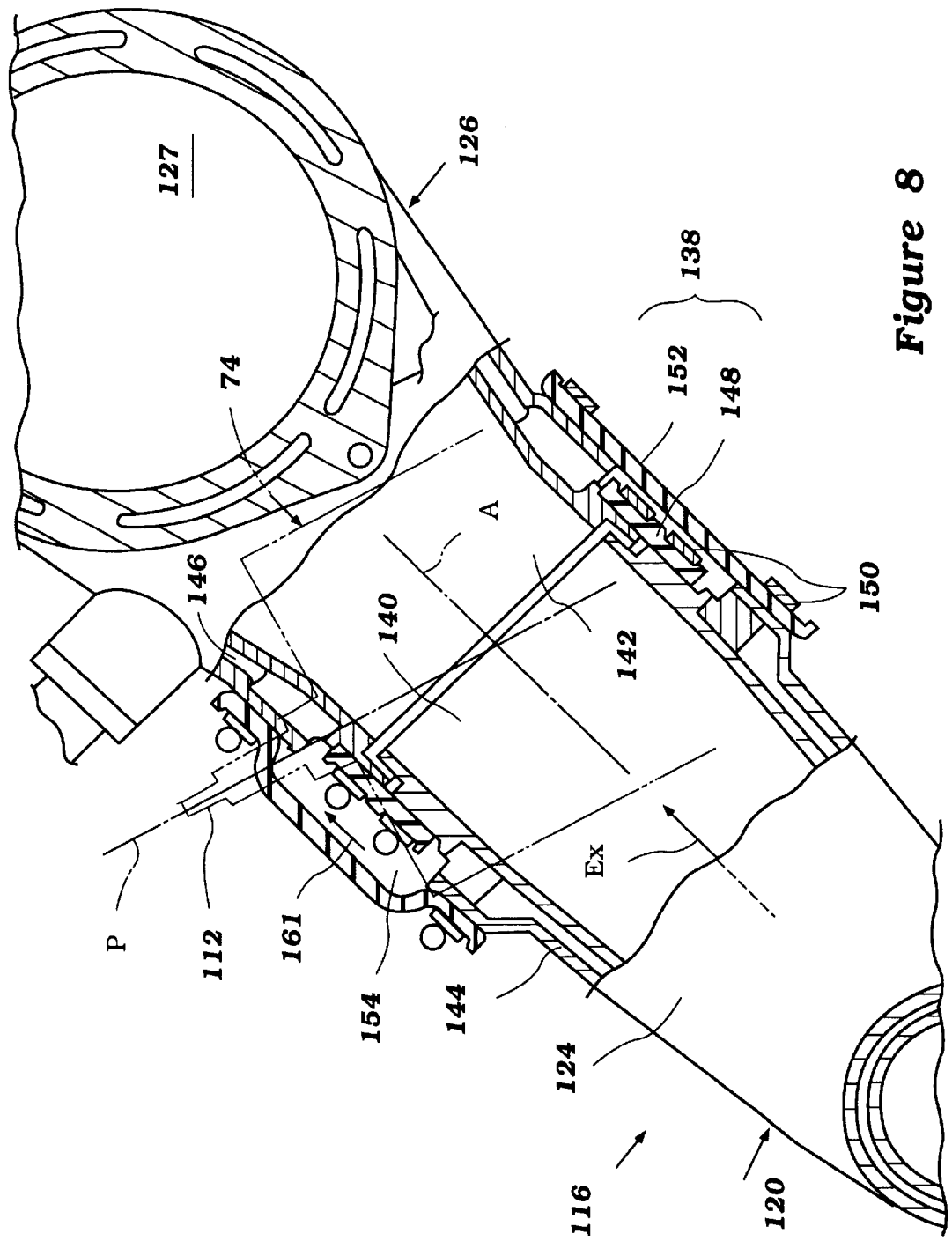
FIG. 8 is a cross-sectional view of a portion of the exhaust system and taken along Line 8—8 in FIG. 5.

As best illustrated in FIG. 8, the pipe part 124 of the manifold 120 is connected to the expansion pipe 126 with a connector or coupling 138. The coupling 138 joins an end 140 of the manifold 120 to an end 142 of the expansion pipe 126. Preferably, at their connection, the manifold 120 and expansion pipe 126 extend along a common axis A which extends generally perpendicular to the axis C along which the crankshaft 54 extends.

The manifold 120 preferably includes a first water jacket 144 provided about at least a portion of the passage 125 therethrough. Likewise, the expansion pipe 126 preferably includes a second water jacket 146 provided about at least a portion the passage 127 therethrough. As illustrated, each of these water jackets 144,146 are defined between respective inner sleeve (defining the exhaust passage 125,127 therethrough) and outer sleeves of the manifold 120 and expansion pipe 126.

The coupling 138 preferably includes an inner coupling part 148 for joining the inner sleeves of the manifold 120 and expansion pipe 126. This coupling 148 part is secured to both the manifold 120 and expansion pipe 126 with a band 150, providing a contiguous exhaust flow path from the passage 125 in the manifold 120 to the passage 127 in the expansion pipe 126.

Likewise, the coupling 138 includes an outer coupling part 152 for joining the outer sleeves of the manifold 120 and expansion pipe 126. This coupling part 152 is also secured to both the manifold 120 and expansion pipe 126 with a band 150. So arranged, a water passage 154 is defined through the coupling 138 between the water jackets 144,146.

The parts 148,152 of the coupling 138 are preferably constructed of a flexible, but heat-resistant material.

Most importantly, and in accordance with the present invention, the manifold 120 and expansion pipe 126 join at the coupling 138, the coupling 138 intersected by a vertical plane extending through the axis C about which the crankshaft 54 rotates. Thus, when looking down on the engine 22, as illustrated in FIG. 6, the opposing end portions 138,142 of the manifold 120 and expansion pipe 126 join in an area generally in alignment with (although vertically above) the axis C through the crankshaft 54.

The engine 22 may also preferably include a suitable cooling system 160, as generally known to those skilled in the art. Preferably, water 161 is drawn from a part of the propulsion passage 60 where the water is under high pressure. This water 161 is routed through one or more supply lines 162 into a number of water inlet ports 164.

As illustrated, at least one inlet port 164 leads into the manifold water jacket 144. This water flows through the first water jacket 144, the water passage 154 defined by the coupling 138 and then into and through the second water jacket 146 for cooling the expansion pipe 126. In this manner, the exhaust system 116 of the engine 22 is cooled.

At least one inlet port 164 preferably leads to one or more water jackets 166 in the cylinder block 70 and head 72 for cooling each cylinder 74, as best illustrated in FIG. 5. After passing through these water jackets 166, the water preferably flows to a return chamber 168 formed in the cylinder head 72. A thermostat 172 is positioned between the chamber 168 and a discharge pipe 170 which extends to an in water discharge, such as in the propulsion passage 60, for controlling the flow of cooling water through the cooling system 160.

The exhaust system of the present invention overcomes the problems of exhaust systems in accordance with the prior art. In particular, the connection of the manifold 120 or first portion of the exhaust system with the expansion pipe 126 or second portion of the exhaust system is aligned with the central axis C along which the crankshaft 54 rotates. This positioning minimizes the forces, such as vibrational forces, acting upon the exhaust system, including the coupling 138. That is, the intensity of these external forces increases in the direction of either side of the axis C (i.e. in the side-to-side direction of the watercraft), such that positioning of the manifold 120 to expansion pipe 126 connection in general alignment with (in the side-to-side direction of the craft) this axis minimizes the forces to which the coupling 138 is exposed, greatly extending the life of the coupling.

In addition, the secure coupling of the manifold 120 and expansion pipe 126 portions of the exhaust system 116 to the engine 22 additionally reduces the amplitude of any exhaust system movement. When the exhaust system components move very little, the coupling 138 need not flex to as large a degree to absorb the relative movement of the manifold 120 and expansion pipe 126 portions, further contributing to an extension in the life of the coupling 138.

Of course, the foregoing description is that of preferred embodiments of the invention, and various changes and modifications may be made without departing from the spirit and scope of the invention, as defined by the appended claims.

What is claimed is:

1. A watercraft having a hull, a water propulsion device and an internal combustion engine with an output shaft in driving relation with said water propulsion device, said output shaft extending along a first axis, said engine connected to said hull and having at least one combustion chamber with an exhaust passage leading therefrom, an exhaust manifold having a first end connected to said engine and having a passage therethrough leading from said exhaust passage, said exhaust manifold having a second end, and an exhaust pipe having a first end connected to said second end of said exhaust manifold at a connection, said connection positioned directly vertically above said first axis.

2. The watercraft in accordance with claim 1, wherein a coupling joins the first end of said exhaust pipe to said second end of said exhaust manifold.

3. The watercraft in accordance with claim 1, wherein said engine has an opposing front end and rear end and an opposing first side and second side, and wherein said exhaust manifold is connected to one of said first side of said engine.

4. The watercraft in accordance with claim 3, wherein said first axis extends through said front and rear ends of said engine and said connection is positioned at the front end of said engine.

5. The watercraft in accordance with claim 3, wherein said manifold extends forwardly from its connection to said first side of said engine and then curves about said front end of said engine to said second end.

6. The watercraft in accordance with claim 3, wherein said exhaust pipe extends along said second side of said engine opposite said exhaust manifold.

7. The watercraft in accordance with claim 6, wherein said exhaust pipe is connected to said second side of said engine.

8. The watercraft in accordance with claim 1, wherein said engine has two combustion chambers, each combustion chamber having an exhaust passage leading therefrom, and wherein said first end of said exhaust manifold is branched and includes a branch corresponding to each combustion chamber.

9. The watercraft in accordance with claim 1, wherein a water jacket is provided about said exhaust manifold and exhaust pipe, and wherein said connection includes means for providing a flow path between said water jackets.

10. An exhaust system for an engine powering a water propulsion device of a watercraft, said engine having at least one cylinder with an exhaust passage leading therefrom, a piston movably mounted in said cylinder and connected to a crankshaft, a vertical plane extending through said crankshaft parallel to a length thereof, said exhaust system including a manifold portion having a first end connected to said engine and having a passage therethrough leading from said exhaust passage, and including an exhaust pipe, and a connector connecting a first end of said exhaust pipe to a second end of said manifold portion, said vertical plane extending through said connector.

11. The exhaust system in accordance with claim 10, wherein said engine has a first side, a second side and a first end and a second end, and wherein said vertical plane extends through said first and second ends and between said sides, and wherein manifold portion is connected to said first side of said engine.

12. The exhaust system in accordance with claim 11, wherein said exhaust pipe is connected to said second side of said engine.

13. The exhaust system in accordance with claim 11, wherein said connector is positioned in front of said front end of said engine.

14. The exhaust system in accordance with claim 10, wherein a first water jacket is provided for cooling said manifold portion and a second water jacket is provided for cooling said exhaust pipe, and wherein said connector includes means for permitting a flow of coolant between said first and second water jackets.

15. The exhaust system in accordance with claim 10, wherein said connector comprises a flexible member having a first end and a second end, the first end connected to said manifold portion with at least one band and said second end connected to said exhaust pipe with at least one band.

16. The exhaust system in accordance with claim 10, wherein said exhaust pipe includes an expansion pipe portion.

17. The exhaust system in accordance with claim 10, wherein said manifold portion is branched at its first end.

* * * * *